(12) United States Patent
Cheng et al.

(10) Patent No.: US 9,007,769 B2
(45) Date of Patent: *Apr. 14, 2015

(54) ELECTRONIC DEVICE

(71) Applicants: Inventec (Pudong) Technology Corporation, Shanghai (CN); Inventec Corporation, Taipei (TW)

(72) Inventors: Yi-Lun Cheng, Taipei (TW); Ming-Hung Lin, Taipei (TW); Chun-Lung Lin, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 136 days.

This patent is subject to a terminal disclaimer.

(21) Appl. No.: 13/795,794

(22) Filed: Mar. 12, 2013

(65) Prior Publication Data

US 2014/0118948 A1 May 1, 2014

(30) Foreign Application Priority Data

Oct. 31, 2012 (CN) .......................... 2012 1 0428819

(51) Int. Cl.
*H05K 7/00* (2006.01)
*G06F 1/20* (2006.01)
*G06F 1/16* (2006.01)

(52) U.S. Cl.
CPC .............. *G06F 1/203* (2013.01); *G06F 1/1626* (2013.01); *G06F 1/1656* (2013.01)

(58) Field of Classification Search
USPC ........................................ 361/700; 257/77, 76
See application file for complete search history.

(56) References Cited

U.S. PATENT DOCUMENTS 5,660,318 A * 8/1997 Jung et al. ..................... 228/102
2013/0112993 A1 * 5/2013 Hayashi et al. ................. 257/77

* cited by examiner

*Primary Examiner* — Andargie M Aychillhum
(74) *Attorney, Agent, or Firm* — Huffman Law Group, PC

(57) ABSTRACT

An electronic device includes a housing, a heat source located inside a casing, and a heat dissipation device disposed inside a casing. The heat dissipation device is in thermal contact with the heat source. The heat dissipation device includes a casing having a heat dissipation material. The heat dissipation material includes 15 to 30 volume percent of multiple copper materials, 50 to 85 volume percent of a phase change material, and 15 to 20 volume percent of air. The casing has a surface being in thermal contact with the heat source. A central area and an outer ring area are defined on the surface. The outer ring area surrounds the central area. A geometric midpoint of the central area and a geometric midpoint of the surface are overlapped. The heat dissipation device absorbs heat generated by the heat source located in the central area through thermal conduction.

9 Claims, 4 Drawing Sheets

ELECTRONIC DEVICE

This non-provisional application claims priority under 35 U.S.C. §119(a) on Patent Application No(s). 201210428819.9 filed in China, P.R.C. on Oct. 31, 2012, the entire contents of which are hereby incorporated by reference.

BACKGROUND

1. Technical Field

The disclosure relates to an electronic device, and more particularly to an electronic device having a heat dissipation device.

2. Related Art

With the constant development of technology, current daily necessities are developed toward digitization and informatization. For example, a mobile processing device, such as a notebook computer and a tablet computer, is easily carried by a user, so as to be freely used by the user on any occasion.

Furthermore, a set of heat dissipation fins and a fan are generally disposed in a mobile processing device, so as to remove heat generated by the mobile processing device. However, as the performance of the mobile processing device increases, heat generated during the processing increases as well. To address this issue, typically the heat dissipation area of the heat dissipation fins and the power of the fan are increased, so as to improve the heat dissipation efficiency of the mobile processing device.

However, under the trend of technology development, researchers devote their efforts to continuously developing the mobile processing device toward the objectives of having high performance as well as the slim design and small in size. The increasing of the heat dissipation area of the heat dissipation fins and the power of the fan cause the internal volume of the mobile processing device to be increased additionally to accommodate larger heat dissipation fins and a high-power fan. Therefore, the development trend of the mobile processing device toward the slim design is impeded.

SUMMARY

The disclosure provides an electronic device comprising a housing, a heat source, and a heat dissipation device. The heat source is located inside the housing. The heat dissipation device is disposed inside the housing and is in thermal contact with the heat source. The heat dissipation device comprises a casing having a heat dissipation material. The heat dissipation material comprises 15 to 30 volume percent of a plurality of copper materials, 50 to 85 volume percent of a phase change material, and 15 to 20 volume percent of air. Further, the casing has a surface being in thermal contact with the heat source. A central area and an outer ring area are defined on the surface. The outer ring area surrounds the central area. A geometric midpoint of the central area and a geometric midpoint of the surface are overlapped with each other. The area of the central area is 10% to 50% of the area of the surface. The heat source is located in the central area. The heat dissipation device absorbs heat generated by the heat source through thermal conduction.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The detailed features and advantages of the disclosure are described below in great detail through the following embodiments, and the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

Figure 1:
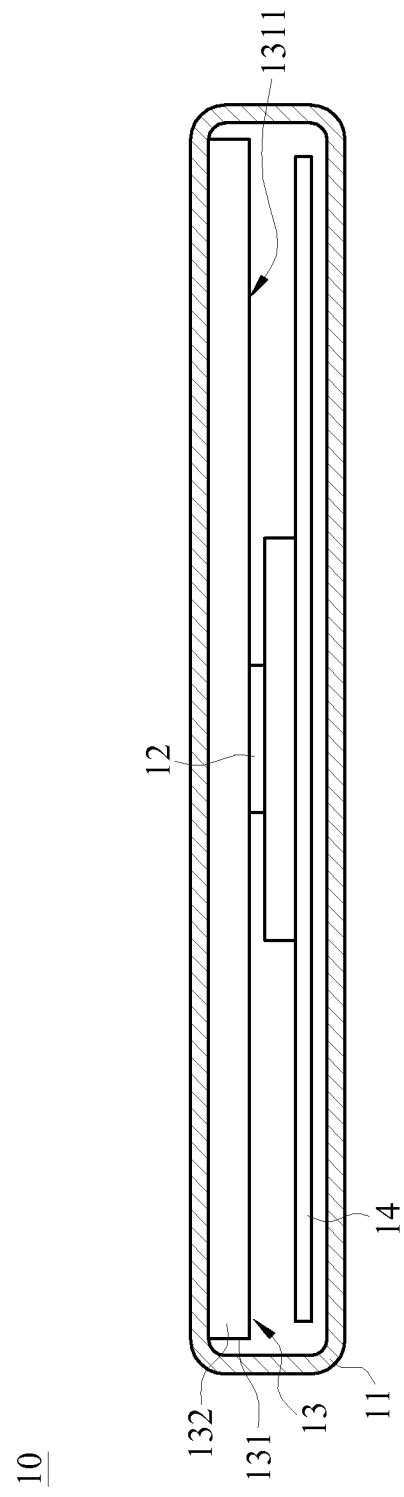
FIG. 1 is a sectional view of an electronic device according to one embodiment of the disclosure.
Figure 2:
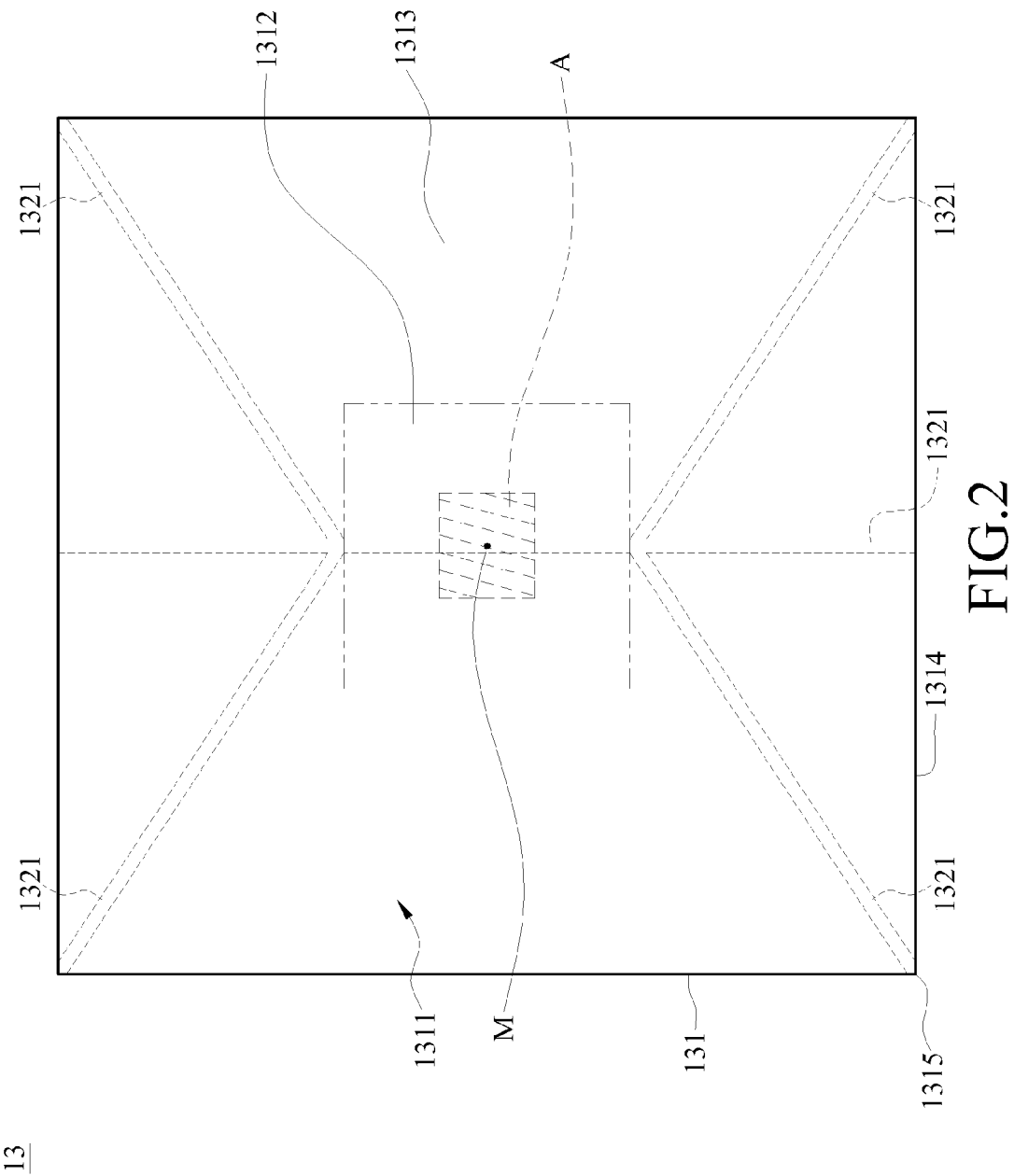
FIG. 2 is a bottom view of a heat dissipation device in FIG. 1.

Referring to FIG. 1 and FIG. 2, FIG. 1 is a sectional view of an electronic device according to one embodiment of the disclosure, and FIG. 2 is a bottom view of a heat dissipation device according to FIG. 1.

An electronic device 10 of this embodiment comprises a housing 11, a heat source 12, and a heat dissipation device 13. In this embodiment and other embodiments, the electronic device 10 may be a tablet computer, a mobile phone, or other electronic products.

A circuit board 14 is disposed inside the housing 11. The heat source 12 is disposed on the circuit board 14 and is inside the housing 11. In this embodiment and other embodiments, the heat source 12 may be an arithmetic processing chip of a tablet computer, a mobile phone, or other electronic products.

The heat dissipation device 13 is disposed inside the housing 11, and the heat dissipation device 13 is in thermal contact with the heat source 12. Specifically, the heat dissipation device 13 is attached to the heat source 12, so as to directly contact the heat source 12. The heat dissipation device 13 of the electronic device 10 of the disclosure is capable of absorbing heat generated by the heat source 12 effectively, so as to enable the heat source of, for example, various electronic elements to operate normally.

The heat dissipation device 13 comprises a casing 131. The shape of the casing 131 may be a cube or other cuboids and the material of the casing 131 may be aluminum, copper, or other appropriate materials. A heat dissipation material 132 is disposed inside the casing 131. The heat dissipation material 132 comprises 15 to 30 volume percent of a plurality of copper materials, 50 to 85 volume percent of a phase change material, and 15 to 20 volume percent of air. In this embodiment, the heat dissipation material 132 comprises 15 to 20 volume percent of the copper materials, 64 to 67 volume percent of a phase change material, and 16 to 17 volume percent of air. The copper materials may be copper tubes, copper partition plates, or other copper members. The phase change material may be alkanes such as paraffin. The phase change material of this embodiment may change from a solid state to a liquid state by absorbing heat. During the process in which the phase change material absorbs the heat to change from the solid state to the liquid state, the temperature of the phase change material may keep at a certain value without rising. After the phase change material changes from the solid state to the liquid state, the volume of the phase change material increases. However, air has excellent compressibility, which provides an extra space for the expansion of the phase change material. Therefore, the purpose of the air comprised in the heat dissipation material 132 is to solve the problem of the increased volume of the phase change material due to the phase change. Thus, air is adapted to avoid the problem that the increase of the volume of the phase change material causes the space inside the casing 131 to be insufficient to accommodate the heat dissipation material 132.

Furthermore, the casing 131 of the heat dissipation device 13 has a surface 1311. The heat dissipation device 13 is in thermal contact with the heat source 12 through the surface 1311. A central area 1312 and an outer ring area 1313 are defined on the surface 1311. The outer ring area 1313 surrounds the central area 1312.

Moreover, each of the central area 1312, the surface 1311, and the heat dissipation device 13 of this embodiment have a geometric midpoints M. The geometric midpoints M are overlapped with each other. The area of the central area 1312 is, for example, 10% to 50% of the area of the surface 1311. In this embodiment, the area of the central area 1312 is 10% of the area of the surface 1311. The shape of the area of the central area 1312 may be a scale-down version (namely, reduce proportionally) of the shape of the area of the surface 1311. A contact region A between the heat source 12 and the surface 1311 is located in the central area 1312. The heat dissipation device 13 absorbs the heat of the heat source 12 through thermal conduction.

Referring to FIG. 2, in this embodiment, the copper materials comprised by the heat dissipation material 132 in the heat dissipation device 13 are a plurality of copper tubes 1321. The copper tubes 1321 are located inside the casing 131. The copper tubes 1321 extend from the central area 1312 towards the outer ring area 1313. One copper tube 1321 overlaps with the contact region A where the heat source 12 contacts the surface 1311 of the heat dissipation device 13, and the copper tube 1321 further passes through the geometric midpoint M of the heat dissipation device 13. Moreover, some of the copper tubes 1321 extend to four corner portions 1315 of the casing 131 of the heat dissipation device 13 respectively. Some of the copper tubes 1321 extend to two opposite side edges 1314 of the casing 131 of the heat dissipation device 13. Specifically, the copper tubes 1321 extend from the central area 1312 towards the outer ring area 1313 to expand as radially as possible.

In this embodiment, the number and the extension manner of the copper tubes 1321 illustrated in this embodiment are not intended to limit the disclosure. Persons skilled in the art may design the number and the extension manner of the copper tubes 1321 appropriately according to the shape of the heat dissipation device 13 and the position of the heat source 12.

By disposing the copper tubes 1321, when the heat source 12 transfers heat to the central area 1312 of the heat dissipation device 13 through thermal conduction, the heat may be rapidly transferred and dispersed from the central area 1312 to the entire outer ring area 1313 of the heat dissipation device 13 through the copper tubes 1321. Therefore, all corners of the heat dissipation device 13 can receive the heat evenly, so as to enable the entire phase change material in the heat dissipation device 13 to absorb the heat evenly to undergo phase changing, thereby improving the heat absorption efficiency of the heat dissipation device 13. Furthermore, the heat dissipation device 13 of this embodiment is not required to be equipped with an exhaust fan, so as to be applicable to a thin electronic device.

Furthermore, the heat dissipation material 132 in the heat dissipation device 13 comprises the phase change material. In the process in which the phase change material absorbs the heat to undergo the phase change, the temperature of the phase change material does not rise. Consequently, the temperature of the heat dissipation device 13 is capable of being kept for a long time in a comfortable temperature state by selecting an appropriate phase change material. For example, when an phase change material with the phase change temperature being about 37 degrees is selected, during the heat absorption process of the heat dissipation device 13, the temperature of the heat dissipation device 13 is capable of being kept for a long time in a comfortable temperature state of 37 degrees. Therefore, when a user holds the electronic device 10 for a long time, the hand-scalding problem caused by the constant rise of the temperature of the housing 11 of the electronic device 10 incurred by the heat absorption of the heat dissipation device 13 is avoided.

Furthermore, in this embodiment or other embodiments, a plurality of sets of heat dissipation fins (not shown) may be disposed on the surface of the heat dissipation device 13, so as to further improve the heat absorption efficiency of the heat dissipation device 13.

Figure 3:
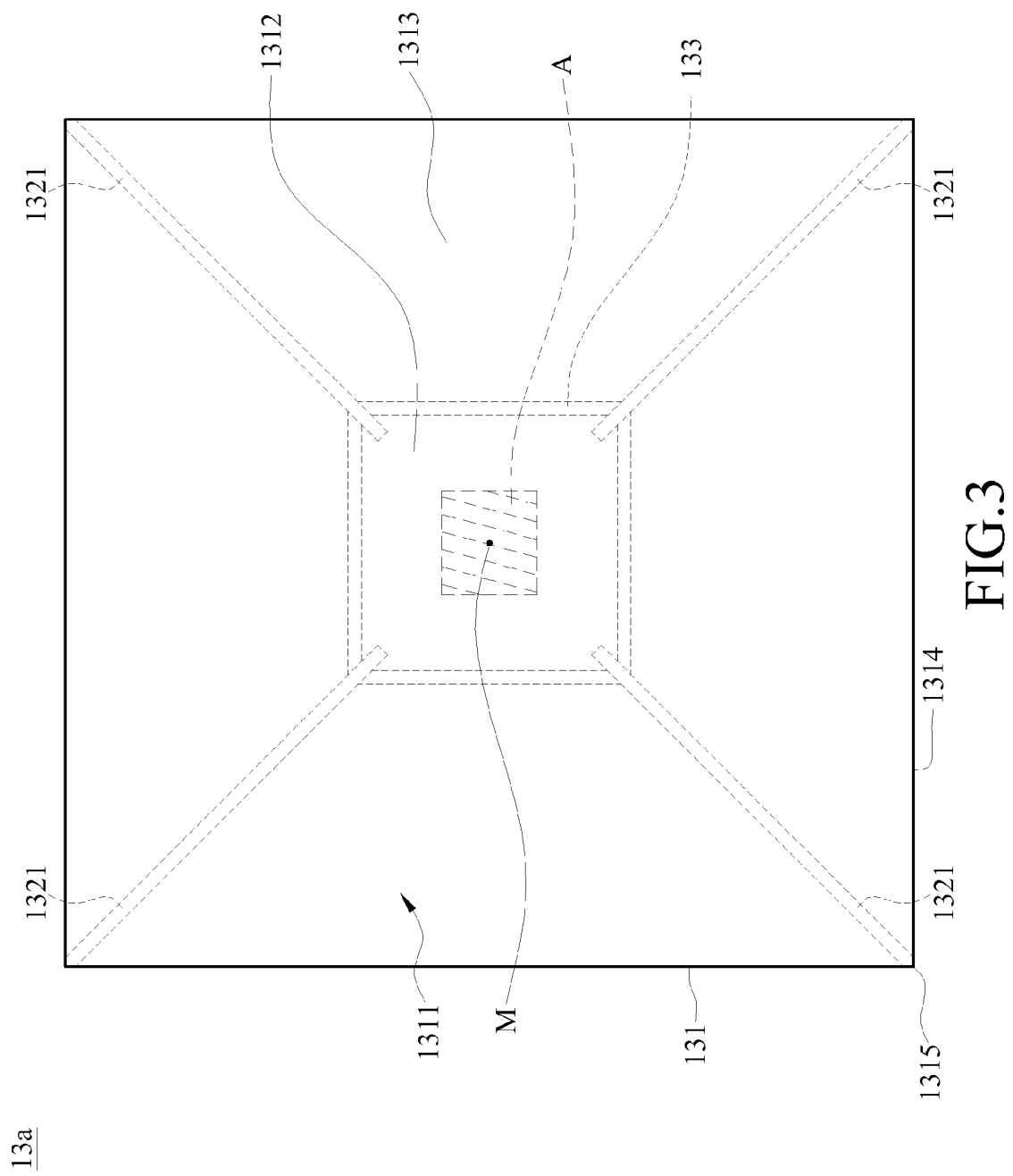
FIG. 3 is a bottom view of a heat dissipation device according to another embodiment of the disclosure.

Referring to FIG. 3, a bottom view is presented of a heat dissipation device according to another embodiment of the disclosure.

In this embodiment, a plurality of copper materials comprised by a heat dissipation material 132 in a heat dissipation device 13a are a plurality of copper tubes 1321. The copper tubes 1321 are located inside a casing 131. The copper tubes 1321 extend from a central area 1312 towards an outer ring area 1313, and each of the copper tubes 1321 and a geometric midpoint M of the heat dissipation device 13a are kept from each other at a distance. In other words, in this embodiment, the copper tubes 1321 do not pass through the geometric midpoint M of the heat dissipation device 13a. Furthermore, some of the copper tubes 1321 extend to four corner portions 1315 of the casing 131 of the heat dissipation device 13a respectively, so as to enable heat to be rapidly transferred and dispersed from the central area 1312 to the entire outer ring area 1313 of the heat dissipation device 13a through the copper tubes 1321.

Additionally, a plurality of aluminum partition plates 133 is disposed inside the casing 131. The aluminum partition plates 133 may be located between the central area 1312 and the outer ring area 1313, so as to form a rectangular frame body, thereby separating the central area 1312 from the outer ring area 1313. Moreover, the copper tubes 1321 extend from all corner portions of the rectangular frame body formed by the aluminum partition plates 133 to all the corner portions 1315 of the casing 131 respectively. Specifically, positions, where the aluminum partition plates 133 are disposed, inside the casing 131 are not intended to limit the disclosure. In addition, the volume percent of the aluminum partition plates 133 is less than 3% of the volume percent of the copper tubes 1321, so as to prevent the heat absorption effect of the heat dissipation device 13a from being lowered.

Furthermore, by disposing the aluminum partition plates 133, the interior of the casing 131 is divided into at least two areas, so as to ensure that the phase change material of each area inside the casing 131 is evenly distributed. Thus, the problem that the heat absorption efficiency of the heat dissipation device 13a is affected by uneven distribution of the phase change material due to accumulation of the phase change material in a specific area (for example, the bottom) inside the casing 131 incurred by multiple phase changes and the influence of gravity may be avoided.

When a heat source 12 transfers heat to the central area 1312 of the heat dissipation device 13a through thermal conduction, the phase change material in the central area 1312 absorbs the heat to undergo phase changing first. Meanwhile, the phase change material in the central area 1312 quickly transfers and disperses the absorbed heat from the central area 1312 to the entire outer ring area 1313 of the heat dissipation device 13*a* through the copper tubes 1321 and the aluminum partition plates 133. Therefore, all corners of the heat dissipation device 13*a* can receive the heat evenly, so as to enable the entire phase change material in the heat dissipation device 13*a* to absorb the heat evenly to undergo phase change, thereby improving the heat absorption efficiency of the heat dissipation device 13*a*.

Figure 4:
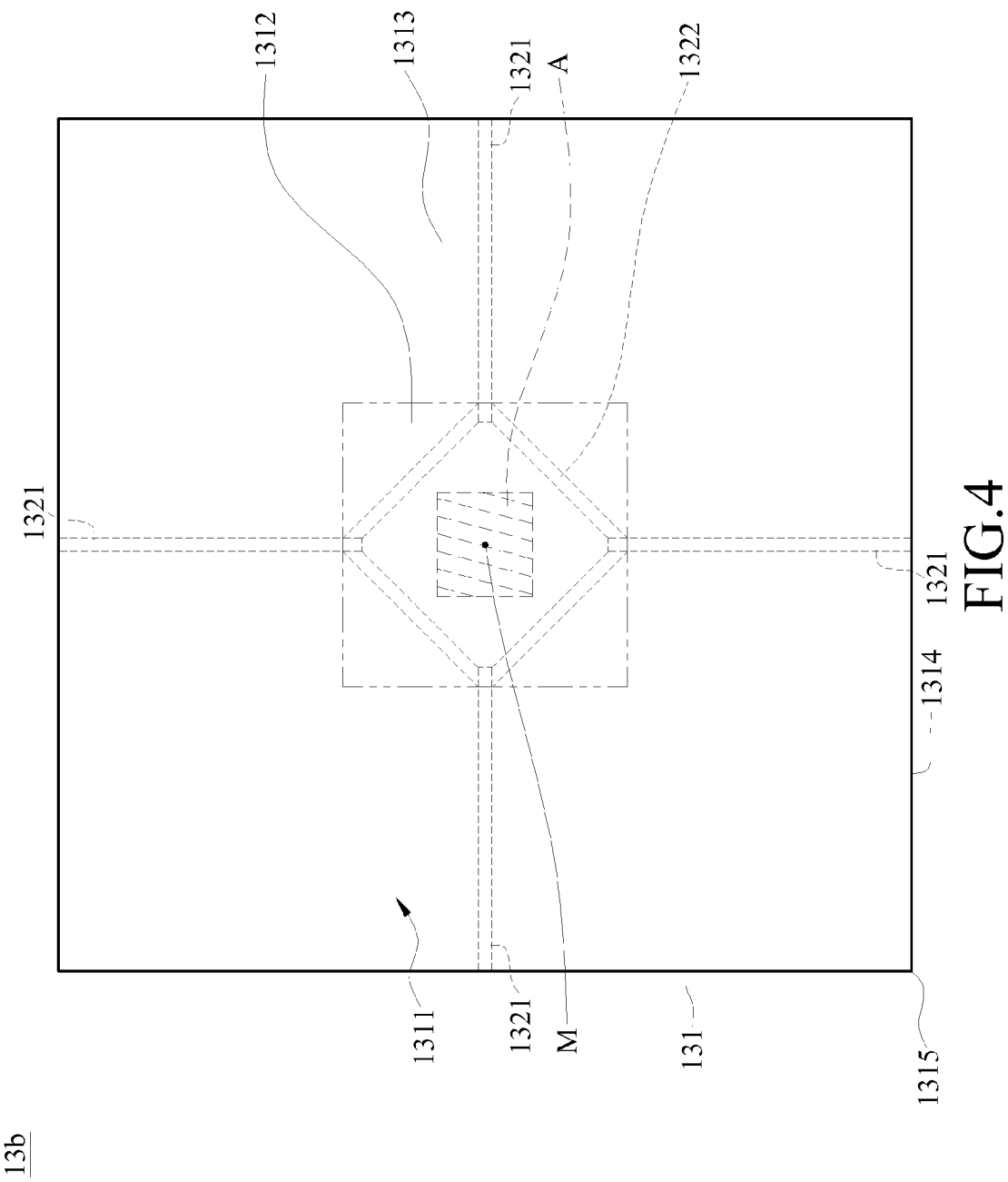
FIG. 4 is a bottom view of a heat dissipation device according to still another embodiment of the disclosure.

Referring to FIG. 4, a bottom view is presented of a heat dissipation device according to still another embodiment of the disclosure.

In this embodiment, a plurality of copper materials comprised by a heat dissipation material 132 in a heat dissipation device 13*b* are a plurality of copper tubes 1321 and a plurality of copper partition plates 1322. The copper tubes 1321 and the copper partition plates 1322 are located inside a casing 131. The copper tubes 1321 extend from a central area 1312 towards an outer ring area 1313, and each of the copper tubes 1321 and a geometric midpoint M of the heat dissipation device 13*b* are kept from each other at a distance. In other words, in this embodiment, the copper tubes 1321 do not pass through the geometric midpoint M of the heat dissipation device 13*b*. Furthermore, the copper partition plates 1322 surround the geometric midpoint M of the heat dissipation device 13*b*, so as to form a rhombic frame body. The copper tubes 1321 extend from all corner portions of the rhombic frame body formed by the copper partition plates 1322 to all side edges 1314 of the casing 131 respectively.

Therefore, by disposing the copper partition plates 1322, the interior of the casing 131 is divided into at least two areas, so as to ensure that the phase change material of each area inside the casing 131 is evenly distributed Thus, the problem that the heat absorption efficiency of the heat dissipation device 13*b* is affected by uneven distribution of the phase change material due to accumulation of the phase change material in a specific area (for example, the bottom) inside the casing 131 incurred by a plurality of phase changes and the influence of gravity may be avoided.

When a heat source 12 transfers heat to the central area 1312 of the heat dissipation device 13*b* through thermal conduction, the phase change material in the central area 1312 absorbs the heat to undergo phase changing first. Meanwhile, the phase change material in the central area 1312 quickly transfers and disperses the absorbed heat from the central area 1312 to the entire outer ring area 1313 of the heat dissipation device 13*b* through the copper tubes 1321 and the copper partition plates 1322. Therefore, all corners of the heat dissipation device 13*b* can receive the heat evenly, so as to enable the entire phase change material in the heat dissipation device 13*b* to absorb the heat evenly to undergo phase change, thereby improving the heat absorption efficiency of the heat dissipation device 13*b*.

According to the electronic device of the embodiment, the heat dissipation material comprises 15 to 30 volume percent of copper materials, 50 to 85 volume percent of the phase change material, and 15 to 20 volume percent of air, so as to enable the heat to be quickly transferred and dispersed to the entire heat dissipation device through the copper materials. Therefore, the entire phase change material in the heat dissipation device may absorb the heat evenly to undergo the phase change, so as to improve the heat absorption efficiency of the heat dissipation device. Furthermore, the heat dissipation material comprises the phase change material, so that in the heat absorption process of the heat dissipation device, the temperature of the heat dissipation device is capable of being kept for a long time in a comfortable temperature state for holding. Furthermore, the heat dissipation device of this embodiment is not required to be equipped with an exhaust fan, so that the heat dissipation device of this embodiment is applicable to a thin electronic device, and can reduce the generation of noise.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. An electronic device, comprising:
   a housing;
   a heat source located inside the housing; and
   a heat dissipation device disposed inside the housing, the heat dissipation device being in thermal contact with the heat source, the heat dissipation device comprising a casing, the casing having a heat dissipation material, and the heat dissipation material comprising 15 to 30 volume percent of a plurality of copper materials, 50 to 85 volume percent of a phase change material, and 15 to 20 volume percent of air, and a constituent of the phase change material is an alkane;
   wherein the casing has a surface being in thermal contact with the heat source, a central area and an outer ring area are defined on the surface, the outer ring area surrounds the central area, a geometric midpoint of the central area and a geometric midpoint of the surface are overlapped with each other, the area of the central area is 10% to 50% of the area of the surface, the heat source is located in the central area, and the heat dissipation device absorbs heat generated by the heat source through thermal conduction.

2. The electronic device according to claim 1, wherein the copper materials extend from the central area towards the outer ring area.

3. The electronic device according to claim 2, wherein the copper materials are a plurality of copper tubes or a plurality of copper partition plates, and at least one of the copper materials overlaps a region where the heat source is in contact with the heat dissipation device.

4. The electronic device according to claim 2, wherein at least one of the copper materials passes through a geometric midpoint of the heat dissipation device.

5. The electronic device according to claim 2, wherein each of the copper materials and a geometric midpoint of the heat dissipation device are kept from each other at a distance.

6. The electronic device according to claim 2, wherein the copper materials extend to all corner portions of the casing of the heat dissipation device respectively, or extend to all side edges of the casing of the heat dissipation device respectively.

7. The electronic device according to claim 1, wherein the heat dissipation device comprises a plurality of aluminum partition plates is disposed inside the casing, and the volume percent of the aluminum partition plates is less than 3 percent of the volume percent of the copper materials.

8. The electronic device according to claim 7, wherein the aluminum partition plates surround a geometric midpoint of the heat dissipation device, the copper materials are a plurality of copper tubes, and the copper tubes extend from all corner portions of the aluminum partition plates to all corner portions of the casing respectively.

9. The electronic device according to claim 1, wherein the copper materials are a plurality of copper partition plates and a plurality of copper tubes, the copper partition plates surround a geometric midpoint of the heat dissipation device, and the copper tubes extend from all corner portions of the copper partition plates to all side edges of the casing respectively.

* * * * *